United States Patent [19]

Bloechle

[11] Patent Number: 5,201,373
[45] Date of Patent: Apr. 13, 1993

[54] HAND HELD POWER TOOL WITH SAFETY COUPLING

[75] Inventor: Hans Bloechle, Stuttgart, Fed. Rep. of Germany

[73] Assignee: Robert Bosch GmbH, Stuttgart, Fed. Rep. of Germany

[21] Appl. No.: 806,888

[22] Filed: Dec. 12, 1991

[30] Foreign Application Priority Data

Jan. 5, 1991 [DE] Fed. Rep. of Germany ....... 4100185

[51] Int. Cl.⁵ .............................................. B23Q 5/04
[52] U.S. Cl. ...................................... 173/109; 173/178
[58] Field of Search ............... 173/104, 109, 176, 178, 173/117, 217; 192/56 R, 41 R, 43.1

[56] References Cited

U.S. PATENT DOCUMENTS 3,741,313  6/1973  States .................................. 173/176
4,448,261  5/1984  Kousek et al. ...................... 173/176
4,732,217  3/1988  Bleicher et al. .................... 173/104

Primary Examiner—Douglas D. Watts
Assistant Examiner—Allan M. Schrock
Attorney, Agent, or Firm—Michael J. Striker

[57] ABSTRACT

A hand held power tool, particularly a hammer drill has a housing, a drive shaft, a rotatable tool holder, a safety coupling provided between the drive shaft and the tool holder, and a switching member supported with a bearing axis extending substantially parallel to the drive shaft and freely movable about the bearing axis in a plane extending substantially perpendicularly to the drive shaft. The switching member during a rearward rotation of the housing about an axis of the tool holder engages in the safety coupling and releasing the safety coupling.

15 Claims, 2 Drawing Sheets

HAND HELD POWER TOOL WITH SAFETY COUPLING

BACKGROUND OF THE INVENTION

The present invention relates to a hand held power tool. More particularly it relates to a hand held power tool which is provided with a safety coupling.

Hand held power tools of the above mentioned type for drilling or impact drilling are known. One of such machines is disclosed in the German document DE-C-30 41 099. In this power tool a switching member which is formed as a movably supported mass is deviated from its rest position during clamping or blocking of the drill. The deviated mass actuates an electric switch which in turn interrupts the current supply to the drive motor of the machine. Due to the small switching forces of the mass which acts as an inertia body, the switch can be formed only as a contactless proximity switch which is relatively expensive. The known device also operates only for turning off of the drive force, and it does not provide mechanical decoupling of the drive source from the tool. Therefore due to the subsequently running motor and also high swinging masses, the housing in the event of the blocked tool still rotates relatively significantly further about the tool axis.

SUMMARY OF THE INVENTION

Accordingly, it is an object of the present invention to provide a hand held power tool of the above mentioned general type, which avoids the disadvantages of the prior art.

In keeping with these objects and with others which will become apparent hereinafter, one feature of the present invention resides, briefly stated, in that the switching member, in the case of return rotation of the housing about the axis of the tool holder, engages in the safety coupling which is arranged in a drive train of the hand held power tool, and releases the safety coupling.

When the power tool is designed in accordance with the present invention it has the advantage that, when the tool is blocked, the drive source accelerating the housing is separated from the fixed tool by a simple and reliable mechanical means. An electrical switching means is not needed. The invention has the further advantage that the mechanical safety coupling, in contrast to slipping couplings, that have a fixed releasing moment, is released only when the user in the case of the clamped drill cannot hold the housing of the hammer drill in a normal operational position and the housing is suddenly turned through. After turning-off of the machine the safety coupling again automatically closes.

In accordance with another advantageous feature of the present invention, the inertia body acts on a ring which rotates relative to the drive shaft and is connected with one coupling half of the safety coupling. The ring can be connected with the drive shaft for example by a left thread so that during its rotation relative to the drive shaft it moves axially. The relative speed is produced in that in the event of blocking, the ring is braked by the contact with the inertia mass which is driven in movement.

It is especially advantageous when the thread between the ring and the drive shaft is released at the end so that with the released coupling the ring can freely rotate. In order to again arrest the coupling after the blocking, a pressure spring can act on the ring and provide a closing of the safety coupling after turning-off of the drive motor.

In accordance with another advantageous feature of the present invention an unintentional releasing of the coupling is prevented by retaining the inertia body in its rest position either with a small holding force or with an arresting moment which substantially corresponds to a torque produced by its own weight. It is especially advantageous to provide surfaces with high friction on the inertia body and on the ring. They can be formed for example by teeth and they case a fast braking of the ring. Finally, the ring can be arranged displaceably or tiltably in its axial direction, so that the inertia body which engages in the ring does not hinder its axial movement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
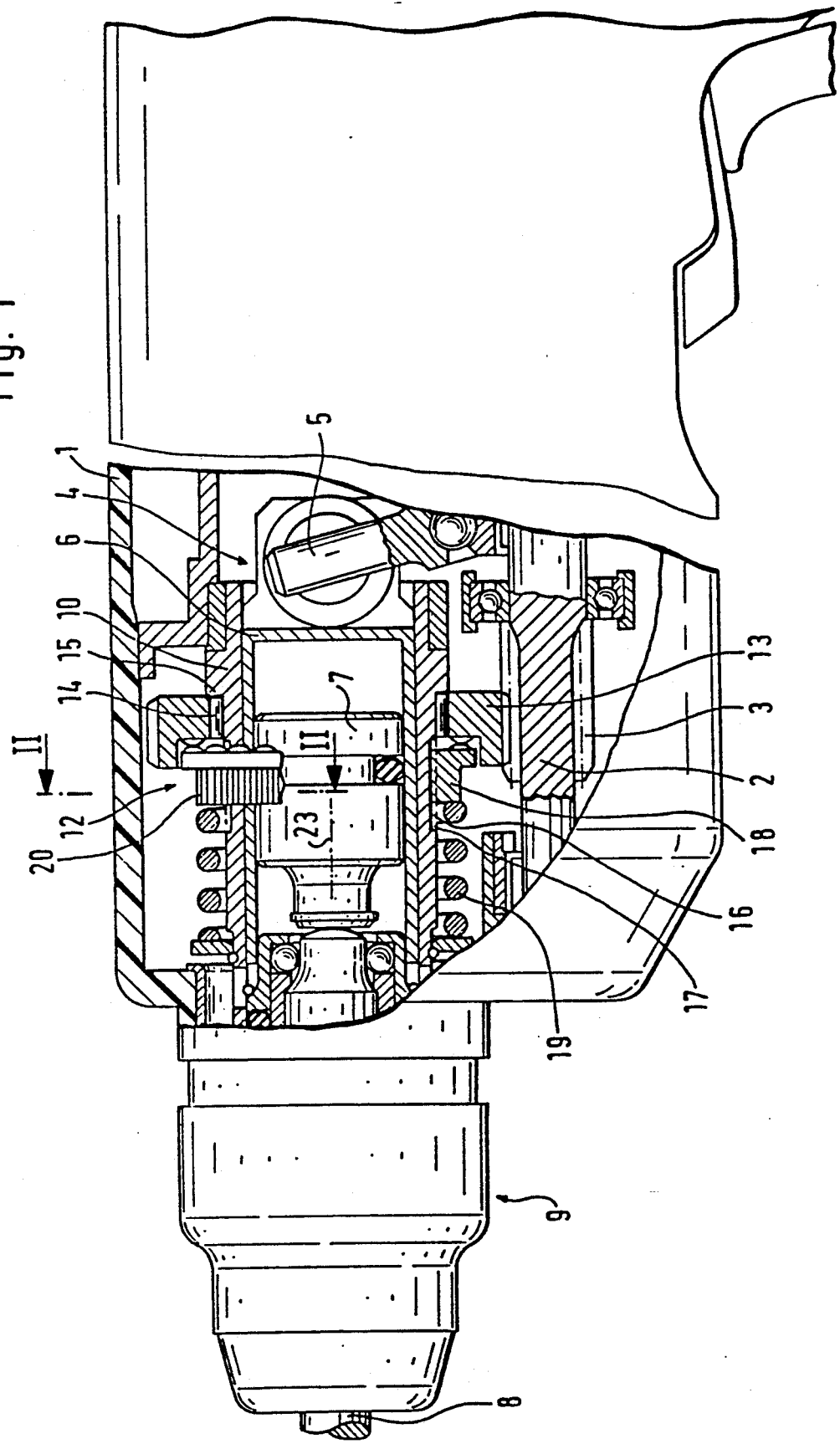
FIG. 1 is a view showing a partial section of a hammer drill in accordance with the present invention.

A hand held power tool formed as a hammer drill has a housing 1 which accommodates a not shown electrical motor, for example for right and left running. The rotary movement of the motor is transferred to an intermediate shaft 2 having an outer toothing 3. A wobble finger 5 is arranged on the intermediate shaft 2 for driving an impact mechanism 4 with a wobble disc. The wobble finger 5 drives a hollow piston 6, in which a striking member 7 applies an axial impact against a tool 8. The tool 8 is held in a tool holder 9 which is driven by a hollow spindle 10 during a drilling operation to perform a right-direction rotation. The hollow piston 6 is guided in the spindle 10.

The spindle 10 is in a driving connection with the intermediate shaft 2 through a safety coupling 12. The connection is performed through a half of the safety coupling, which is formed by a toothed gear 13. The toothed gear 13 is freely rotatably supported on the spindle 10 by means of a needle bearing 14 and is connected with the spindle in an axially non-displaceable fashion. The toothed gear 13 abuts against a collar 15 of the spindle at the side of the motor. At the side of the rear bearing 14 which is closer to the tool holder 9, the spindle 10 has a left thread 16. The thread 16 is preferably a multiple thread and runs out at its end 17 which faces away of the coupling half 13.

A ring 18 engages with the left thread 16 and forms a second coupling half of the safety coupling 12. The ring 18 and the toothed gear 13 have coupling coatings which face one another and produce form-locking and frictional connection. The coatings can be formed as claws or linings with high friction coefficients. Also, the coupling can be formed as conical coupling. The ring 18 is pressed against the toothed gear 13 by a relatively weak pressure spring 19. An additional closing force is applied to the safety coupling 12 during the operation of the hammer drill, by the spindle which is driven to rotate in a right direction and through the left thread between the spindle and the ring 18. The ring 18 has on its periphery a friction surface 20 with a high friction coefficient. The friction surface 20 can also be provided with knurles or teeth.

Figure 2:
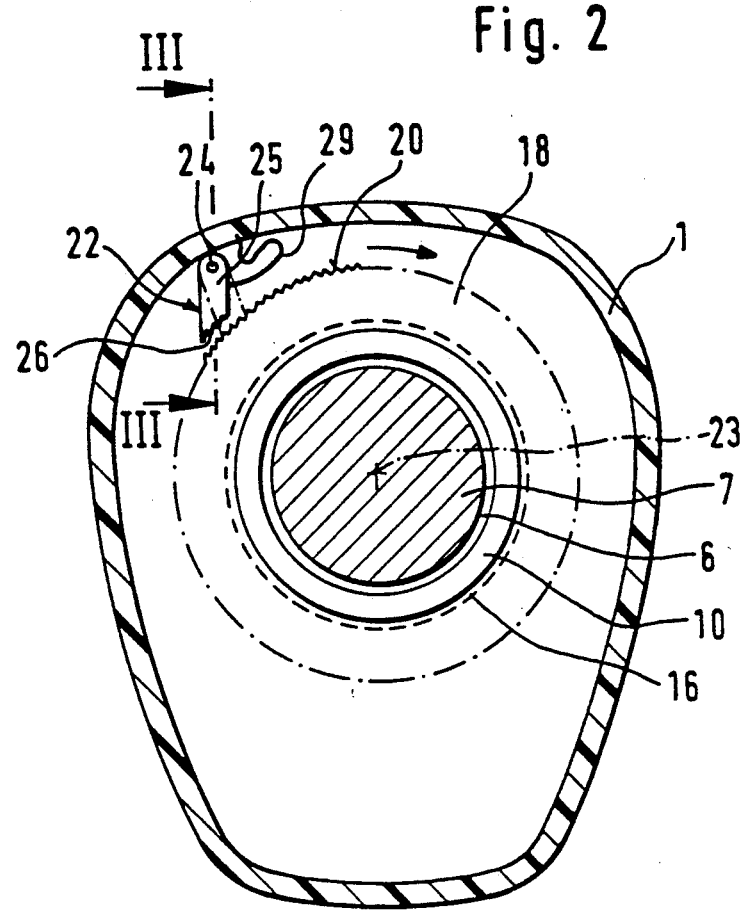
FIG. 2 is a simplified view showing a section along the line II—II in FIG. 1.
Figure 3:
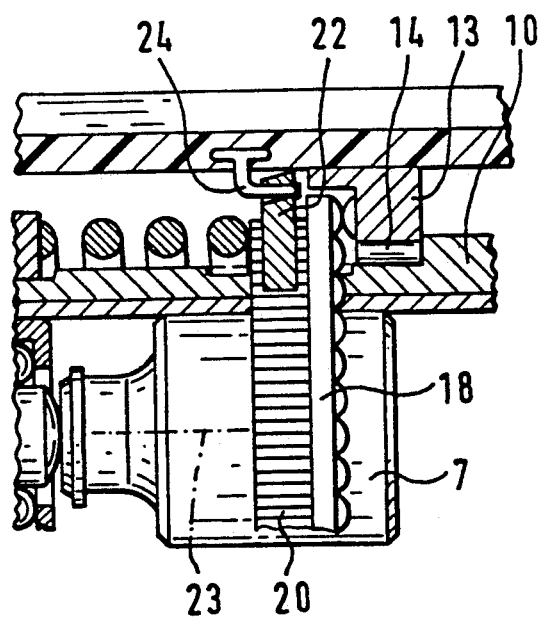
FIG. 3 is a view showing a section of the inventive power tool through a bearing axis, as a fragment of FIG. 2 on an enlarged scale.

As can be seen from FIGS. 2 and 3, a switching member 22 is suspended on its one end in the housing 1 radially outside of the ring 18. The switching member 22 is rotatable about a bearing axis 24 extending parallel to the axis 23 of the spindle, and also is suspended tiltably in direction toward the tool holder 9. The switching member 22 is freely suspended on the bearing axis 24, so that a mass piece 25 which is formed of one piece with the switching member 22 can swing about the axis 23 of the spindle outside the radius extending through the bearing axis 24. The switching member 22 has a friction surface 26 at its end which faces away of the bearing axis 24. The friction surface 26 cooperates with the friction surface 20 of the ring 18.

During normal operation the switching member 22 is located in a rest position shown in FIG. 2. Its friction surface 26 is located at a small distance from the friction surface 20 of the ring 18 and does not contact the latter. The spindle 20 and correspondingly the ring 18 rotate to the right in the direction of the arrow.

The release of the safety coupling 12 is performed in accordance with the inertia principle. With the blocked tool 8 and continually running motor, the housing of the hammer drill rotates about the stationary spindle axis 23 to the left. The bearing axis 24 of the switching member 22 is displaced to the left with the housing in FIG. 2. The freely suspended mass piece 25 has a tendency to maintain its absolute position due to its inertia. It moves relative to the housing 1 to the right on the friction surface 20. The switching member 22 is located now in a position relative to the ring 18 which is shown in dash-dot line in FIG. 2. The friction surfaces 20 and 26 which are provided with teeth in the drawing come into contact with one another and the ring 18 which co-rotates with the spindle 10 is braked. Therefore the friction surfaces 20 and 26 are wedged with one another so that the ring 18 stops. During further rotation of the spindle 10 the ring 18 moves along the left thread 16 away from the coupling half 13. Therefore the safety coupling valve is released very fast since the spindle 10 is driven with a higher rotary speed. The rotary drive which acts with the blocked tool 8 onto the housing 1 is interrupted promptly before the hammer drill can slide from the hand of the operator. In the position of the switching member shown in dash-dot line in FIG. 2, in which the switching member 22 directly engages in the safety coupling 12, the rotary angle of the housing 1 reaches approximately 20°.

The drive motor runs still further. For preventing damages to the releasing mechanism of the safety coupling 12 during further rotation of the spindle 10, the left thread 16 on the end 17 which is remote from the coupling 12 is opened so that the ring 18 is there freely rotatable relative to the spindle 10. The switching member 22 remains in permanent engagement or contact with the ring 18 during the release of the coupling 12 until turning-off of the motor. For this purpose the switching member 22 is suspended on its bearing axis 24 so that it is laterally tiltable at least toward one side.

Therefore the switching member can be retained in contact with the friction surface 20 of the ring 18 and does not prevent its axial displacement.

After turning off of the drive motor by the operator, the friction surface 26 of the switching member 22 is released from the surface 20 and the ring 18 is displaced back by the spring 19 to its original position shown in FIG. 1. Therefore, the safety coupling 12 is closed. When the spring 19 in individual cases is not sufficient for the return of the ring 18 or the switching member 22 does not release from the ring 18, this can be achieved by brief touching of the left running of the machine.

In order to use the switching member also in the transverse position of the machine or in other words by 90° with the housing rotating to the right without reaction of the safety coupling, the switching member 22 is held in its rest position by a holding member 29. It applies a weak arresting moment or a holding force which substantially corresponds to the torque released by the gravity force of the switching member 22. The holding member 29 can be formed by a cam arranged laterally of the switching member on the housing 1, or also by a weak spring 29 which retains the switching member 22 in its rest position. The holding member 29 prevents faulty release and on the other hand does not hinder the permissible release of the coupling in the event of blocking due to its low holding force.

The invention is not limited to the shown examples. For example the switching member can have a different shape or suspended at a different space in the housing. What is important is that a mass piece of the switching member lies around the spindle axis outside the radius extending through the bearing axis of the switching member and therefore the inertia forces generated by sudden rotation can be utilized. For releasing the safety coupling a braking of the coupling half provided with the left thread relative to the rotatable spindle is sufficient. This can be achieved by friction or the form-locking connection between the switching member and the coupling half.

It will be understood that each of the elements described above, or two or more together, may also find a useful application in other types of constructions differing from the types described above.

While the invention has been illustrated and described as embodied in a hand held power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A hand held power tool, particularly a hammer drill, comprising a housing; a drive shaft; a rotatable tool holder; a safety coupling provided between said drive shaft and said tool holder; and a switching member supported with a bearing axis extending substantially parallel to said driven shaft and freely movable about said bearing axis in a plane extending substantially perpendicularly to said drive shaft, said switching member being formed so that in response to a jerky rotation of said housing about an axis of said tool holder said switching member engages said safety coupling and releases said safety coupling from said drive shaft.

2. A hand held power tool as defined in claim 1; and further comprising a spindle through which said tool holder is driven in rotation.

3. A hand held power tool as defined in claim 2, wherein said switching member has a mass pieces which in operative condition of the power tool is located outside a radius extending through said bearing axis.

4. A hand held power tool as defined in claim 2, wherein said safety coupling has a coupling half; and further comprising a ring which is rotatable relative to said spindle and connected with said coupling half, said switching member acting on said ring.

5. A hand held power tool as defined in claim 2; and further comprising a shaft which is driven by said motor, said safety coupling having a second half which is connected with said shaft and is rotatable relative to said spindle.

6. A hand held power tool as defined in claim 4; and further comprising a spring which acts on said ring so as to hold said safety coupling in its coupled position.

7. A hand held power tool as defined in claim 1; and further comprising a holding member which retains said switching member in its rest position.

8. A hand held power tool as defined in claim 7, wherein said holding member applies to said switching member a holding force which corresponds to the weight of said switching member.

9. A hand held power tool as defined in claim 70, wherein said holding member applies an arresting moment to said switching member.

10. A hand held power tool as defined in claim 4, wherein said ring and said switching member are provided with friction surfaces which face toward one another.

11. A hand held power tool as defined in claim 1, wherein said switching member is suspended on said bearing axis tiltably in direction of a spindle axis.

12. A hand held power tool, particularly a hammer drill, comprising a housing; a drive shaft; a rotatable tool holder; a safety coupling provided between said drive shaft and said tool holder; a switching member supported with a bearing axis extending substantially parallel to said drive shaft and freely movable about said bearing axis in a plane extending substantially perpendicularly to said drive shaft, said switching member being formed so that in response to a jerky rotation of said housing about an axis of said tool holder said switching member engages said safety coupling and releases said safety coupling from said drive shaft; a spindle through which said tool holder is driven in rotation, said safety coupling has a coupling half; and a ring which is rotatable relative to said spindle and connected with said coupling half, said switching member acting on said ring, said ring being connected with said spindle through a thread.

13. A hand held power tool as defined in claim 12, wherein said thread which connects said ring with said spindle is a left thread.

14. A hand held power tool as defined in claim 12, wherein said thread goes out at its end which is remote from said coupling, said ring being freely rotatable relative to said spindle at said end.

15. A hand held power tool as defined in claim 12, wherein said ring and said switching member are provided with toothings which face toward one another.

* * * * *